United States Patent
Nelias

(10) Patent No.: US 8,062,727 B2
(45) Date of Patent: Nov. 22, 2011

(54) PROCESS FOR MOLDED DECORATIVE STITCHED SKINS

(75) Inventor: Francois Nelias, Croix (FR)

(73) Assignee: Visteon Global Technologies, Inc., Van Buren Township, MI (US)

( * ) Notice: Subject to any disclaimer, the term of this patent is extended or adjusted under 35 U.S.C. 154(b) by 407 days.

(21) Appl. No.: 12/244,305

(22) Filed: Oct. 2, 2008

(65) Prior Publication Data

US 2009/0087614 A1   Apr. 2, 2009

(30) Foreign Application Priority Data

Oct. 2, 2007   (FR) ...................................... 07 58016

(51) Int. Cl.
*B32B 3/06*   (2006.01)
*B32B 7/08*   (2006.01)
*B60J 5/00*   (2006.01)

(52) U.S. Cl. .......... 428/102; 428/61; 428/123; 428/125; 428/174; 428/192; 296/146.7; 112/422

(58) Field of Classification Search .................... 428/61, 428/123, 125, 126, 174, 192, 102; 296/146.7; 280/728.1; 112/141, 475.06, 422
See application file for complete search history.

(56) References Cited

U.S. PATENT DOCUMENTS

| | | | | |
|---|---|---|---|---|
| 2,115,368 | A | * | 4/1938 | Lustberg ......................... 428/57 |
| 2,458,500 | A | * | 1/1949 | Bertrand et al. .............. 428/102 |
| 5,304,273 | A | * | 4/1994 | Kenrick et al. ................ 156/219 |
| 6,214,157 | B1 | * | 4/2001 | Spengler .................... 156/304.6 |
| 2006/0024476 | A1 | | 2/2006 | Leland et al. |
| 2006/0068130 | A1 | * | 3/2006 | Dooley et al. ................... 428/31 |
| 2007/0082165 | A1 | * | 4/2007 | Barrett ............................ 428/57 |

FOREIGN PATENT DOCUMENTS

| EP | 1 334 818 A1 | 8/2003 |
|---|---|---|
| EP | 1 820 625 A1 | 8/2007 |

* cited by examiner

*Primary Examiner* — Donald J Loney
(74) *Attorney, Agent, or Firm* — Fraser Clemens Martin & Miller LLC; J. Douglas Miller

(57) ABSTRACT

The invention relates to a covered panel for a motor vehicle having a rigid substrate, a skin, and a layer of material connecting the skin to the rigid substrate, in which the skin is constituted of one first and one second skin section including a visual characteristic at the line where the two respective edges of the first and second section of the skin are joined. The panel is characterized in that the edge of the first section of skin extends beyond the visual characteristic, under the second section of skin, and in that the skin is provided, in the area of that visual characteristic with at least one line of decorative seams or stitching connecting the first and second sections of skin together. The invention also relates to a process to manufacture the type of panel.

6 Claims, 1 Drawing Sheet

PROCESS FOR MOLDED DECORATIVE STITCHED SKINS

CROSS-REFERENCE TO RELATED APPLICATION

Figure 1:
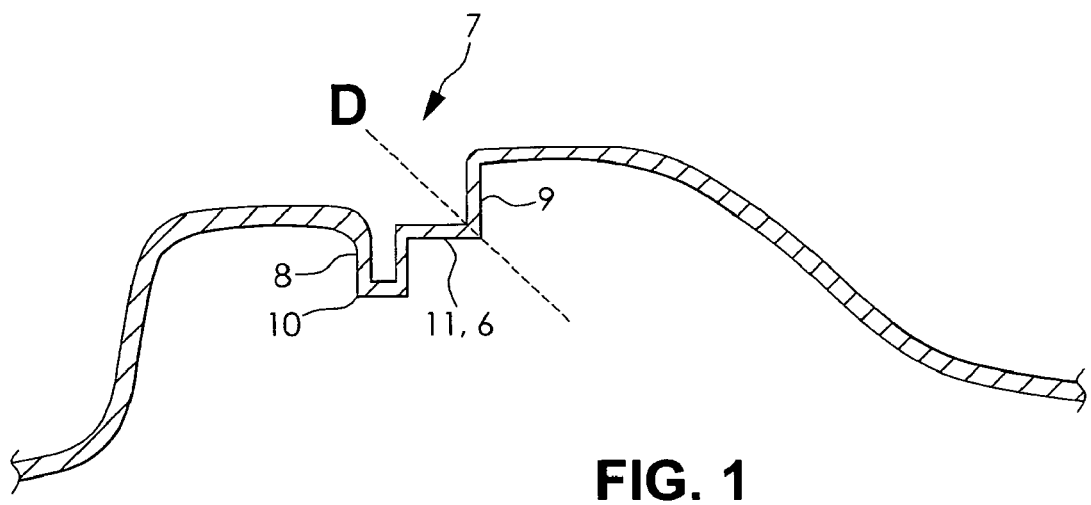

This application claims priority to French Patent Application No. 07 58016, filed Oct. 2, 2007, the entire disclosure of which is hereby incorporated herein by reference.

FIELD OF THE INVENTION

The invention concerns the field in which articles for panels that are flat or not flat and which are made of composite coverings, specifically console panels, instrument panels or interior vehicle trims, the object of which is a lined panel or interior lining for a motor vehicle, as well as the manufacturing process of such a panel.

BACKGROUND OF THE INVENTION

The type of panels dealt with in this invention comprises a substrate forming the panel body, generally in a molded foam or thermoplastic material upon the surface of which a skin or similar element is placed for primarily decorative purposes (in a synthetic material with the required surface appearance) showing a linear visual structure characteristic which corresponds to a functional line of the construction or assembly.

Through the applicant's document, EP-A-1 334.818, incorporated herein by reference in its entirety, a new improved process is made known by which several preformed sections of skin are produced (by forming or molding), which are intended to form the constituent parts of a given decorative skin. These sections are then sewn together to form the decorative skin, before the aforementioned skin is placed on a substrate which forms the body of the panel by one of the fastening modes described previously.

This process presents the disadvantage of requiring many stages, some of which are not automated and require manual intervention, which involves a high cost and generates a relatively significant rate of waste, which therefore makes it impossible to guarantee a rigorous standardization.

Moreover, it proves interesting, and improves the aesthetic aspect of the panel at the area where the two skins are assembled, to have one or several seam lines. These should be parallel to the assembly line. However, the processes known to date do not make it possible to systematically guarantee obtaining this type of line or perfectly parallel seam lines at the point where the two skins are assembled to form the functional construction or assembly line.

Moreover, in the currently known processes, it is necessary to first sew the assembly seam to connect the skins one to the other. However, this seam may involve deformations or folds, and thus, a degraded appearance.

Moreover, it is generally also necessary to fold or stitch back and then glue the edges (commonly indicated under the end of the rearmost part of the seam) of the parts making up the skins after their assembly. However, this stage is manual and does not guarantee a consistent fold strip, so the visual aspect of the visible surface of the skin is often degraded.

SUMMARY OF THE INVENTION

The purpose of this invention is to mitigate some of the above mentioned disadvantages and to propose a method for producing such a panel from several skins, presenting seam lines suitably laid out and in which the appearance at the place where the skins are assembled is improved. Moreover, with this process, it will be possible to carry out in a limited number of manufacturing steps which will be possible to easily automate and standardize.

For this purpose, the invention has for its object a covered or lined panel for a motor vehicle, consisting of a rigid substrate, a skin or decorative covering and an intermediate layer of fastening material connecting the aforementioned skin to the rigid substrate, in which the skin is constituted of a first and second skin section defining a visible surface comprising on the aforesaid visible surface a visual characteristic with a linear structure corresponding to the line where the two respective edges of the first and second section of the skin are assembled, characterized in that the edge of the first section of skin extends beyond the visual characteristic, under the second section of skin, and in that the skin is provided, on its visible surface, in the area of this visual characteristic and along the latter, with at least one line of decorative seam or stitching connecting the first and second sections of skin together.

The invention also concerns the process for manufacturing a panel, in particular, an interior covered or lined panel for a motor vehicle, equipped on the surface with a skin or decorative covering, made up by assembling at least one first and one second section of skin by one of their respective edges so as to obtain, on the area where the aforesaid first and second sections of skin were assembled, and on the visible surface of the aforesaid skin or decorative covering, a visual characteristic with a linear structure, by a process characterized in that it consists of performing the following steps: i) assemble the first and second sections of skin along their corresponding edges by joining the aforesaid edges, so as to form a skin or decorative covering provided on its visible surface with a visual characteristic having a linear structure corresponding to the line where the aforesaid first and second sections of skin were assembled, which presents the visual characteristic in this area of the skin, on one side of the latter, the edge of the first section of skin extending under the second section of skin, ii) produce, during one or more operation(s) of sewing or stitching, at least one line of decorative seaming or stitching extending along the visual characteristic, of which at least one connects the aforementioned first and second sections of skin together, iii) place the skin or decorative covering thus formed upon a substrate forming the body of the panel, by joining, welding, layering of an intermediate alveolar material for purposes of attachment, in situ foam or similar material constituting the panel body.

According to an embodiment of the invention, the skin for a motor vehicle interior comprises a first skin section having an outer edge; a second skin section having an outer edge, wherein at least a portion of the edge of the first skin section extends beyond and under at least a portion of the edge of the second skin section; and a first stitching connecting the first skin section and the second skin section.

According to another embodiment of the invention, the skin for a motor vehicle interior comprises a first skin section having a first surface, a second surface, and an outer edge, wherein at least a portion of the edge of the first skin section includes a substantially U-shaped depression formed therein with a band formed intermediate the U-shaped depression and the edge; a second skin section having a first surface, a second surface, and an outer edge, wherein the band of the first skin section extends beyond and under at least a portion of the edge of the second skin section; and a first stitching connecting the first skin section and the second skin section.

A method of forming the skin is also disclosed.

The method according to an embodiment of the invention comprises the steps of providing a first skin section having an outer edge and a second skin section having an outer edge; assembling the first skin section and the second skin section along at least a portion of their corresponding edges by disposing the edges adjacent one another to form the skin, the edge of the first skin section extending under the edge of the second skin section; and joining the edge of the first skin section to the edge of the second skin section.

DRAWINGS

Figure 2:
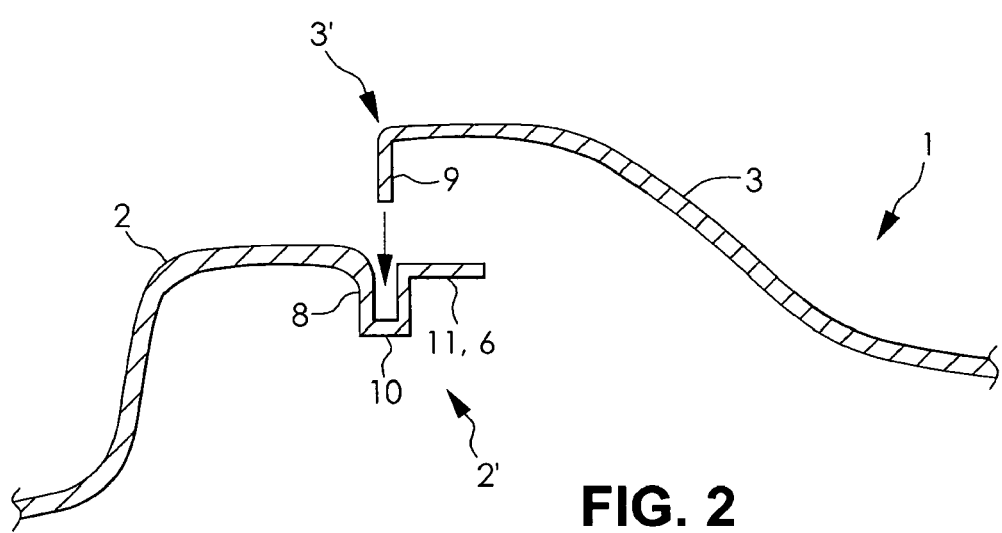
Figure 3:
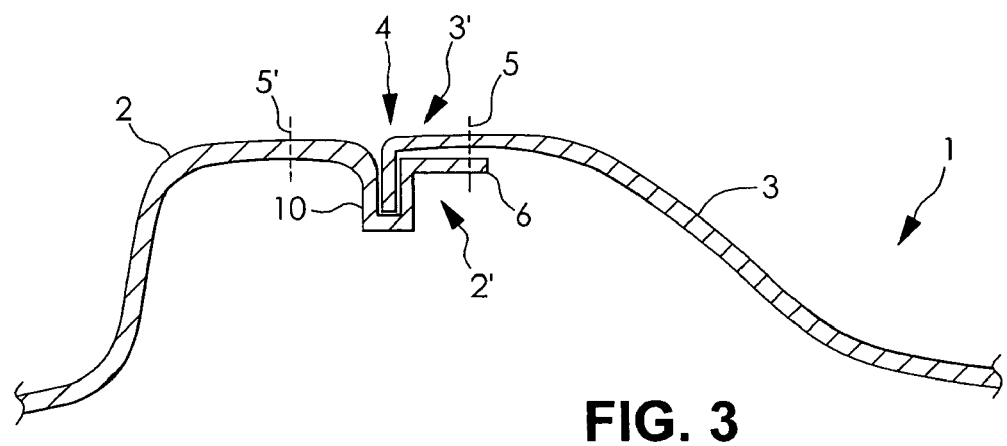

The invention will be better understood, due to the description below, relative to a preferred embodiment, given as a non-restrictive example, and explained with reference to the attached schematic drawings, in which:

FIG. 1 is a cross-sectional view of a section of skin from which the first and second sections of skin originate, and which are able to be assembled to create a skin or decorative covering according to the invention, FIG. 2 is a view similar to that of FIG. 1 and is representative of the assembly of the first and second sections of skin which originate with the skin section shown in FIG. 1, and FIG. 3 is a cross-sectional view of the skin or decorative covering obtained by assembling the first and second section of skin shown in FIG. 2.

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features.

The covering or lining panel for a motor vehicle according to the invention consists of a rigid substrate, a skin 1 or decorative covering such as that represented in FIG. 2 and one layer of intermediate material for attachment connecting the aforementioned skin 1 to the rigid substrate, in which the skin 1 is constituted of one first 2 and one second 3 skin section defining a visible surface comprising on the aforesaid visible surface a visual characteristic 4 with a linear structure corresponding to the line where the two respective edges 2', 3' of the first 2 and second 3 section of the skin are assembled.

It is characterized in that the edge 2' of the first section of skin 2 extends beyond the visual characteristic 4, under the second section of skin 3, and in that the skin 1 is provided, on its visible surface, in the area of this visual characteristic 4 and along the latter, with at least one line of decorative seams or stitching connecting the first 2 and second 3 sections of skin together.

Thus, skin 1 has an increased resistance of being pulled apart because the two sections of skin 2, 3 forming it are connected together on the one hand, through the attachment between their respective edges and, on the other hand, by the seam line 5 which connects the first 2 and the second 3 sections of skin to each other.

On the skin's 1 visible surface, in the area of the visual characteristic 4 and along the latter, it may be provided with at least two lines of decorative seaming or stitching 5, 5' of which at least one seam line 5 connects the first 2 and second 3 sections of the skin together. These two lines of seam or stitching 5, 5' may be laid out on both sides of the visual characteristic 4 or on the same side.

In a characteristic way, and as is shown in FIG. 2, the edge 2' of the first section of skin 2 may form a U-shaped depression 10, into which the edge 3' of the second section of skin 3 is introduced, the hollow in the U-shaped depression 10 is extended, at the free end of the first section of skin 3, by a band 6 upon which the second section of skin 3 rests. The seam line or stitching 5 connects the second section of skin 3 and the band 6. It should be understood that the U-shaped depression 10 makes it possible to retain the second section of skin 3. This is associated with the seam line 5 which connects the first 2 and second 3 sections of the skin again to ensure the integrity of the skin 1.

Another object of this invention is a process to manufacture a panel, specifically an interior covered or lined panel for a motor vehicle, equipped on the surface with a skin 1 or decorative covering, made up by assembling at least a first 2 and second 3 section of skin by one 2', 3' of their respective edges so as to obtain, on the area where the aforesaid first 2 and second 3 sections of skin are assembled, and on the visible surface of the aforesaid skin 1 or decorative covering, a visual characteristic 4 with a linear structure, characterized in that it consists of performing the following steps: i) assemble the first 2 and second 3 sections of skin along their corresponding edges 2', 3' by joining the aforesaid edges 2', 3', so as to form a skin 1 or decorative covering provided on its visible surface with a visual characteristic having a linear structure 4 corresponding to the line where the aforesaid first 2 and second 3 sections of skin were assembled, this skin 1 has in the area of the visual characteristic 4, on one side of the latter, the edge 2' of the first section of skin 2 extending under the second section of skin 3, ii) produce, during one or more operations of sewing or stitching, at least one seam line 5, 5' of decorative seaming or stitching extending along the visual characteristic 4, of which at least one seam line 5 connects the aforementioned first 2 and second 3 sections of skin together, iii) place the skin 1 or decorative covering thus formed upon a substrate forming the body of the panel, by joining, welding, layering of an intermediate alveolar material for purposes of attachment, in situ foam or similar material constituting the panel body.

The seam lines 5, 5' are performed after the assembly by joining the first 2 and second 3 sections of the skin together. In this manner, it is possible to take into account the position of the assembly line of the first 2 and second 3 sections of skin during stitching, and thus, sew one or more precisely placed seam lines, which, moreover will remain unchanged, even after producing the panel. Indeed, the seam line 5 or stitching improves the attachment even more between the first 2 and second 3 sections of skin, which guarantees the fact that the position of the seam lines 5, 5' remains unchanged in comparison with the assembly line or visual characteristic 4, even after applying the skin 1 onto the substrate to form the panel.

Moreover, these seam lines 5, 5' make it possible to obtain an improved finishing of the skin 1.

The act of putting the edges 2', 3' of the first 2 and second 3 sections of the skin together by joining them makes it possible to avoid the need to sew an assembly seam line and to glue the ends of the seams, such as is the case in the existing processes, all the while guaranteeing a suitable appearance of the area where the assembly was carried out.

The process according to the invention may consist of assembling the first 2 and second 3 sections of skin originating from a single piece of skin.

For this purpose, and in a characteristic way, it may also consist of a) producing, by molding or forming, a piece of skin presenting a groove 7, b) performing a cut D in said piece of skin at its groove 7 so as to obtain two sections of skin 2, 3, the respective edges 2', 3' of which are destined to be assembled by joining one skin 1 or decorative covering including at least one part of one of the side walls 8, 9 to the aforesaid groove 7. This type of skin section, with indications of the places to cut, is shown in FIG. 1.

Due to this process, it is thus possible to manufacture a skin 1 or decorative covering provided with a visual characteristic having a linear structure 4 from a single initial piece of skin. The process thus makes it possible to avoid manufacturing separately, i.e., in two different manufacturing steps, the sections of skin which will be assembled to create the skin 1.

As shown in FIGS. 1 and 2, the groove 7 may have, according to a cross-sectional view of the latter, a bottom layer including two lower sections 10, 11 of which one 11 is close to but lower than that of the section of skin and of which the other lower part 10 form, with its two adjacent edges 8, 9, one 8 corresponds to a side wall of the groove 7, a U-shaped depression 10 with a depth equal to the height of the other side wall 9 of the groove 7, the cut line D of the groove 7 may be performed on the lower part 11 so that the edge 3' of the second section of skin 3 is made up of the side wall 9 of the groove 7 and so that the first section of skin 1 is made up of the U-shaped depression 10 and the lower part 10 forming a support band 6 for the second section of skin 3 and the aforementioned process may consist of carrying out the assembly step of the first 2 and second 3 sections while inserting the edge 3' constituted by the side wall 9 of the groove 7 of the second section of skin 3 in the U-shaped depression of the edge 2' of the first section of skin 2.

The curve of the piece of skin and the area to perform the groove 7 in the aforementioned piece of skin will be selected so that the skin 1 or decorative covering originating from the assembly of the first 2 and the second 3 sections of skin has a continuous curve at the level of the visual characteristic with linear structure 4.

Due to the process according to the invention, the manufacture of the skin 1 is facilitated because the edges 2', 3' of the sections of skin 2, 3 do not need to be formed, i.e., folded or curved, before their assembly. This is performed simultaneously with the manufacture of the piece of skin provided with the groove 7. Consequently, the edges 2', 3' of the first 2 and second 3 sections of skin do not have to be formed before their assembly.

After assembling the first 2 and second 3 sections of skin, the process may then consist of performing at least one line of decorative sewing or stitching 5 connecting the support band 6 on the first section of skin 2 to the edge of the second section of skin 3.

The width of the U-shaped depression, i.e., the width of the lower part 10, may be equal to or even much smaller than the thickness of the edge 3' of the second section of skin 3 formed by the side wall 9 so as to obtain a light gathering of said edge 3' when it is inserted in this depression 10 which then forms an retaining area for the edge 3', which makes it possible to improve adhesion between two edges 2', 3'.

The process may also consist of attaching the edges 2', 3' of the two sections of skin 2, 3, together by welding or gluing the areas of contact. This step is carried out before step iii) consisting in pulling the skin 1 formed onto a substrate forming the body of the panel. It may still consist of rigidifying the edges 2', 3' of the first 2 and second 3 sections of skin before their assembly.

The process according to the invention may also consist of assembling the first 2 and second 3 sections of skin having a different appearance. For example, it is possible to assemble two sections of skin with a different feel, or a different color.

All of the steps of the process according to the invention may be easily automated, so that the cost of manufacturing a decorative skin 1 can be reduced considerably. Moreover, the formation of the initial skin provided with a groove 7 allows uninterrupted manufacturing of the initial skins the edges 2', 3' of which present the same fold strip and the same form every time. The ability to repeat the operation is thus assured.

Of course, the invention is not limited to the embodiment described and shown in the attached drawings. Modifications remain possible, in particular from the point of view of the make up of the various items or by substituting technical equivalents, without completely departing from the field of invention protection.

What is claimed is:

1. A skin for a motor vehicle interior comprising:
a first skin section having a first surface, a second surface, and an outer edge, wherein at least a portion of the edge of the first skin section includes a substantially U-shaped depression formed therein with a band formed intermediate the U-shaped depression and the edge;
a second skin section having a first surface, a second surface, and an outer edge, wherein the band of the first skin section extends beyond and under at least a portion of the edge of the second skin section; and
a first stitching connecting the first skin section and the second skin section, wherein the first stitching extends through a single layer of the second skin section and the band of the first skin section to connect the first skin section to the second skin section.

2. The skin according to claim 1, further comprising a second stitching.

3. The skin according to claim 1, wherein the first skin section and the second skin section are originally formed from a single piece of skin which is separated and re-assembled to form the skin.

4. The skin according to claim 1, wherein a width of the U-shaped depression is at most a thickness of the second skin to obtain a gathering of the edge.

5. The skin according to claim 1, wherein a width of the U-shaped depression is less than a thickness of the second skin to obtain a gathering of the edge.

6. The skin according to claim 2, wherein the second stitching connects the first skin section and the second skin section.

* * * * *